Patented May 24, 1932

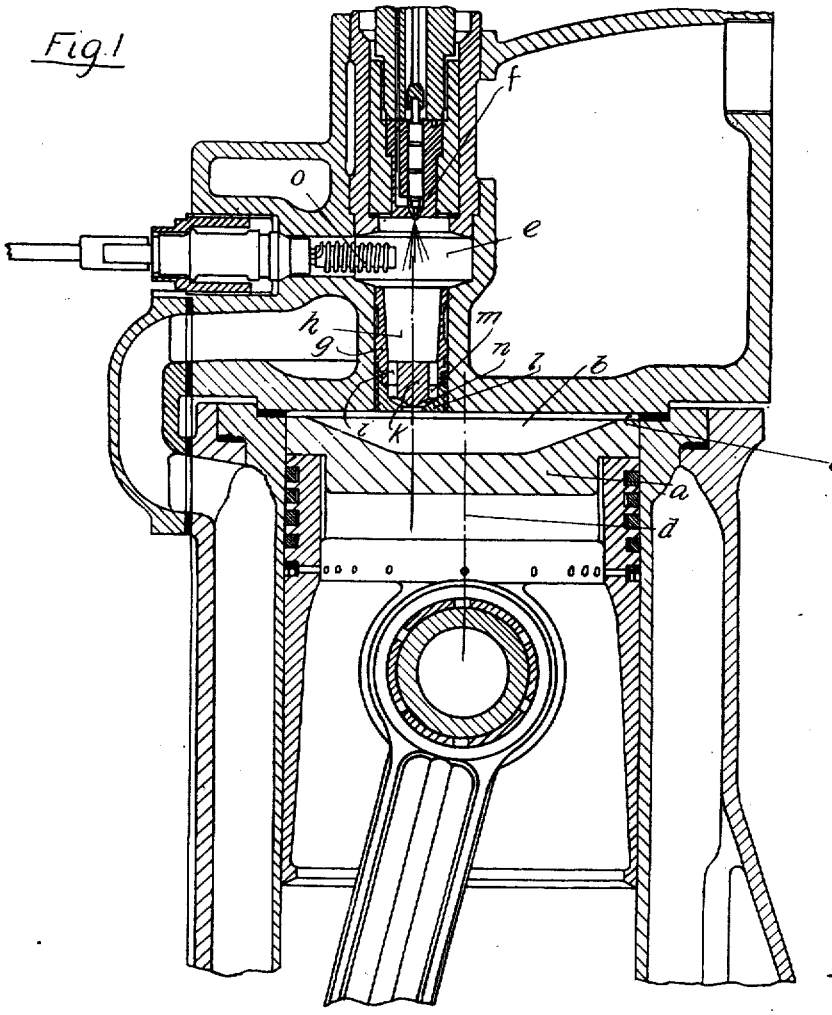
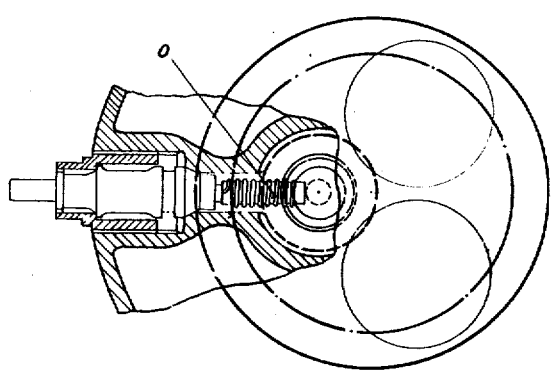
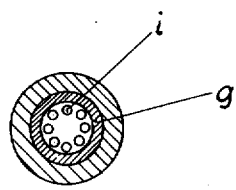

1,859,663

UNITED STATES PATENT OFFICE

PAUL E. FRITZSCHE, OF STUTTGART-UNTERTURKHEIM, GERMANY, ASSIGNOR TO DAIMLER-BENZ AKTIENGESELLSCHAFT, OF STUTTGART-UNTERTURKHEIM, GERMANY, A COMPANY OF GERMANY

DIESEL ENGINE

Application filed April 11, 1930, Serial No. 443,442, and in Germany April 12, 1929.

The present invention refers to internal combustion engines with airless fuel injection of the Diesel type and specially to those adapted for driving motor vehicles.

For these internal combustion engines a perfect atomization of the fuel and an absolute and thorough mixing of air and fuel is of preeminent importance with a view to complete combustion and high efficiency ratio. With the devices used up to now a satisfactory result has not been obtained in this respect.

It is a well known fact that in the case of internal combustion engines with airless fuel injection of the Diesel type, which work without an air compressor, a thorough and uniform mixing of air and fuel is not obtained in all parts of the compression space if for instance the combustion chamber has the form of a disc. This is the reason that other forms have been chosen for the compression space and/or the combustion space.

The compression space has for instance been formed in the head of the piston and has been shaped in such a way that the fuel jet can expand therein to fill the whole space.

Consequently the fuel was burned with greater efficiency and the efficiency ratio of the engine was raised.

The invention refers to engines of this airless injection type and consists therein, that the recess in the bottom of the piston, which recess in itself is a well known feature is arranged in such a way, that the center of said recess lies on or at least very near to the center of the piston, and that the fuel injection valve and/or the ignition chamber is arranged excentrically with regard to the heart of said recess.

According to the invention the compression space is shaped in the form of a rather flat conical frustum. The piston is arranged in such a way in the cylinder, that at the end of the compression stroke the ring shaped top surface of the piston comes close to the cylinder head, so that only a very narrow clearance is left and that consequently all the air is forced in generally radially directed streams into the recess arranged in the bottom of the piston.

In the internal combustion engine of the invention a fuel injection device may be used which in combination with the special disposition of said fuel injection device with regard to the combustion space of very special form gives the very best results with a view to complete fuel combustion and high efficiency ratio.

The principle on which the fuel injection device according to the invention is based consists in the fact that the fuel jet is submitted to a contraction after being ejected by the fuel inlet valve, that next the fuel jet is divided in separate jets and that finally these separate jets are united and that the fuel is injected in atomized condition in the combustion space in the form of a dispersive jet shaped like the nappe surface of a low cone.

According to said fuel injection device of the invention the fuel is injected into an ignition chamber by means of a fuel injection valve of known construction.

The fuel jet is caught in a space, forming part of the ignition chamber, which space has the form of a tumbler. When passing through this tumbler a gradually decreasing cross section is offered to the fuel jet and when arrived at the bottom of said tumbler the fuel jet is divided in several separate jets by means of openings arranged in said bottom. When emerging from said openings the separate fuel jets are conducted together in a cylindrical ring space, which ring space merges into a flat conical ring space ending in the outlet orifice of the atomizer which gives admittance to the combustion space.

With the object of the invention a further increase of the efficiency ratio of the engine is scored over that obtained with known devices and the fuel is burned with greater efficiency and completeness than was possible heretofore.

This advantage is principally due to the increase of the intensity with which fuel and air are mixed together in consequence of the excentric position of the fuel injection valve (of the ignition chamber) with respect to the axis of the piston.

According to the invention every particle of the injected fuel will find within the determined lapse of time the air (the oxygen) necessary for its complete combustion.

With the arrangement of the fuel injection valve according to the invention the further advantage is obtained in that space is gained for giving ample dimensions to the inlet and outlet valves.

In the drawings a form of execution of the combustion engine according to the invention is illustrated.

Fig. 1 is a cross section through an internal combustion engine provided with an ignition chamber.

Fig. 2 is a view of the cylinder head partly broken away to disclose a section through part of the ignition chamber.

Fig. 3 is a cross section through the atomizer.

The bottom $a$ of the piston is provided with a frusto conically shaped recess $b$, surrounded by the ring-shaped outer surface $c$ on top of said bottom $a$.

The recess provided in the bottom of the piston is for instance arranged in such a way that the axis of said recess lies on the axial line $d$ of the cylinder. The piston is arranged in such a way in the cylinder, that at the end of the compression stroke the ring-shaped surface $c$ is brought close to the cylinder head, so that only a very narrow open space remains. When the piston reaches the end of its stroke, the air which is compressed between the ring-shaped surface $c$ and the cylinder head is forced inwardly and mainly radially directed air streams are generated causing a turbulence in the combustion space, the vortex of this turbulence being in the example shown substantially central of the cylinder.

The ignition chamber $e$ is arranged excentrically with regard to the axis $d$ of the cylinder. The fuel inlet valve $f$ opens into the ignition chamber $e$. The atomizer $g$ is placed in the bottom part of the ignition chamber. The atomizer itself comprises several spaces of different cross section.

The atomizer $g$ presents first as a continuation of the ignition chamber a space $h$, the cross section of which slightly decreases in the downward direction. A partition $k$ at the bottom of the space $h$ is pierced by the circular series of holes $i$ which sub-divide the fuel stream and open to a ring-like cone-shaped space $n$ defined between the central conical projection from the partition $k$ and the overhanging flange 1 at the bottom of the member $g$ into which the fuel streams from the openings $i$ are re-united, converging together and intermingling to be discharged through the small centrally located cylindrical opening or port which opens directly to the combustion space.

In the ignition chamber $e$, a heating element $o$ is arranged, which heating element serves for heating the air in the ignition chamber when the engine is started.

The internal combustion engine according to the invention works as follows:

A small part of the fuel injected into the ignition chamber by means of the fuel injection valve is at once burned, atomized and decomposed in said ignition chamber.

The increased pressure resulting from the combustion products of this burned fuel causes the rest of the fuel to be forced in atomized condition into the main combustion space $b$ of the engine. In consequence of the excentric position of the ignition chamber with regard to the combustion space $b$ arranged in the bottom of the piston, the fuel which is introduced in said main combustion space and the air contained in said space are thoroughly mixed and the total quantity of air contained in said main combustion space is transfused by the fuel particles. There is no part, ever so small, of the main combustion space $b$, into which the fuel particles do not enter and there remain no inefficient so called dead spaces.

The special form of the recess shaped like the frustum of a flat cone has proved to be very efficient in this respect. An absolute and intense mixing of air and fuel, which is the dominant feature for obtaining an absolute efficient and complete combustion of the fuel and a high efficiency ratio of the engine is obtained according to the invention by arranging the ignition chamber, by means of which atomized fuel is introduced into the cylinder, excentrically with regard to the axis of said cylinder and by shaping the bottom of the piston in such a way, that a recess is formed which serves as main combustion space.

Without departing from the scope of the invention, the arrangement can also be made in such a way, that the axis of the fuel injection valve (respectively the ignition chamber) is placed substantially on the axial line of the cylinder, and that the axis of the recess formed in the bottom of the piston is placed excentrically with regard to the axial line of the piston.

The internal combustion engine according to the invention is specially adapted for driving motor vehicles.

What I claim is:

1. In an internal combustion engine a cylinder having a flat end wall defining the top side of a combustion space, a piston having a recess formed in the top thereof surrounded by an annular flat part constituting the margin of the piston top, said margin almost touching said flat wall when the piston occupies its end position, a pre-ignition chamber, a fuel inlet nozzle for introducing the fuel into the pre-ignition chamber, in which said fuel is partly burned, another nozzle arranged between the pre-ignition chamber and the combustion space, the outlet opening of said second nozzle arranged in said flat wall forming the top of said combustion space and positioned eccentrically with regard to the recess in the piston top, and means in said second nozzle for obtaining a broad cone-shaped fuel jet directed substantially parallel to the axis of the cylinder.

2. The combination according to claim 1 in which the nozzle between the pre-ignition chamber and the combustion space is an annular frusto-conical canal, the top of which is situated in the outlet-opening of said nozzle to the combustion space.

In testimony whereof I affix my signature.
PAUL E. FRITZSCHE.